United States Patent
Kumagai et al.

(10) Patent No.: US 8,151,962 B2
(45) Date of Patent: Apr. 10, 2012

(54) SYNCHROMESH DEVICE FOR TRANSMISSION

(75) Inventors: Tadashi Kumagai, Okazaki (JP); Jun Yabuta, Nagoya (JP)

(73) Assignee: Aisin AI Co., Ltd., Nishio-Shi, Aichi-Ken (JP)

( * ) Notice: Subject to any disclaimer, the term of this patent is extended or adjusted under 35 U.S.C. 154(b) by 367 days.

(21) Appl. No.: 12/463,471

(22) Filed: May 11, 2009

(65) Prior Publication Data

US 2009/0288928 A1 Nov. 26, 2009

(30) Foreign Application Priority Data

May 20, 2008 (JP) ................................. 2008-131998

(51) Int. Cl.
*F16D 23/06* (2006.01)
(52) U.S. Cl. ..................... 192/53.34; 192/69.9; 192/108
(58) Field of Classification Search ............... 192/53.34, 192/53.341, 69.9, 108, 114 T
See application file for complete search history.

(56) References Cited

U.S. PATENT DOCUMENTS

| | | | | |
|---|---|---|---|---|
| 1,935,965 A | * | 11/1933 | Wahlberg | 192/69.9 |
| 3,861,509 A | * | 1/1975 | Inoue et al. | 192/53.343 |
| 4,817,773 A | * | 4/1989 | Knodel et al. | 192/53.341 |
| 5,960,925 A | * | 10/1999 | Helms et al. | 192/108 |
| 6,370,979 B1 | * | 4/2002 | Tauschek et al. | 74/462 |
| 7,533,592 B2 | * | 5/2009 | Hashimoto et al. | 74/339 |
| 2004/0079611 A1 | * | 4/2004 | Rau et al. | 192/108 |
| 2007/0289835 A1 | * | 12/2007 | Hatori et al. | 192/53.34 |
| 2009/0314599 A1 | * | 12/2009 | Christoffer et al. | 192/53.34 |

FOREIGN PATENT DOCUMENTS

JP 2000-329159 A 11/2000

* cited by examiner

*Primary Examiner* — David D Le
*Assistant Examiner* — Huan Le
(74) *Attorney, Agent, or Firm* — Buchanan Ingersoll & Rooney PC

(57) ABSTRACT

A synchromesh device for a transmission includes: a shaft; a sleeve; an idler gear; a gear piece; a synchronizer ring; a first spline, a second spline and a third spline, the first spline of the sleeve being engageable with each of the second spline of the gear piece and the third spline of the synchronizer ring; and a first chamfer, a second chamfer and a third chamfer, formed at one end of the first spline, one end of the second spline and one end of the third spline, respectively, for a spline-engagement and for a thrust-through operation. The first chamfer of the sleeve includes a small-diameter side thrusting through the third chamfer at the time of shifting and a large-diameter side thrusting through the second chamfer at the time of shifting. A chamfer angle of the large-diameter side is smaller than a chamfer angle of the small-diameter side.

2 Claims, 3 Drawing Sheets

Embodiment

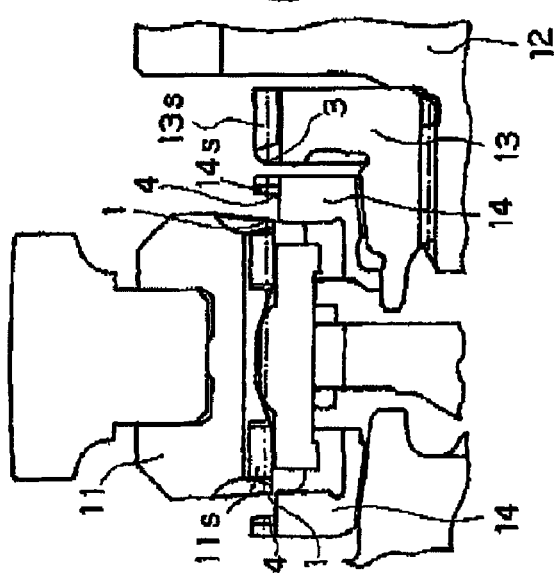
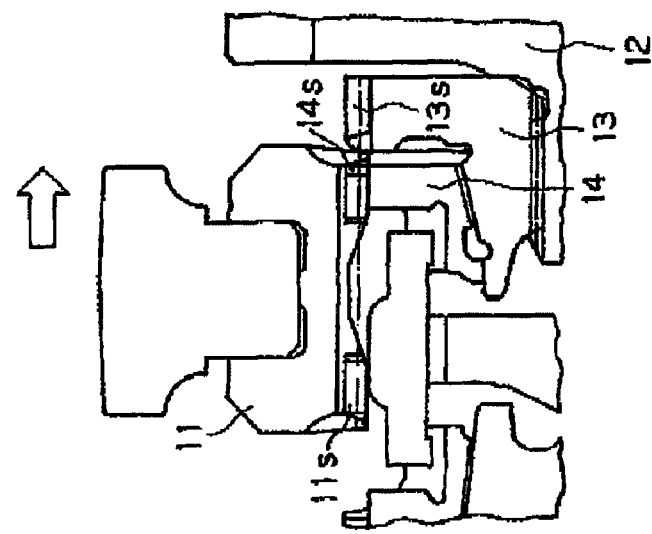
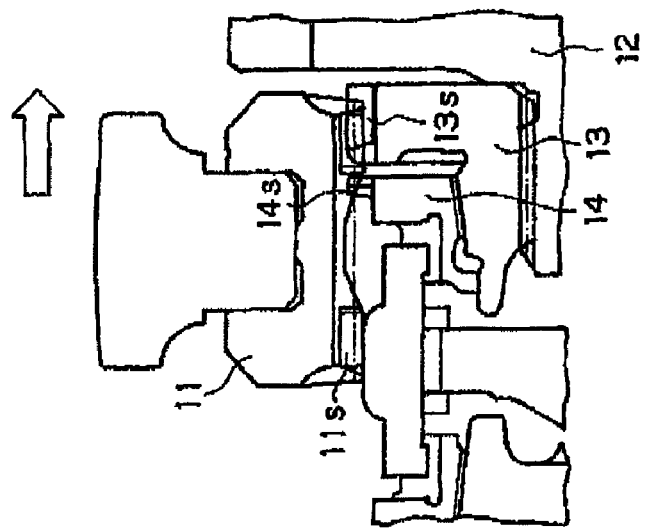

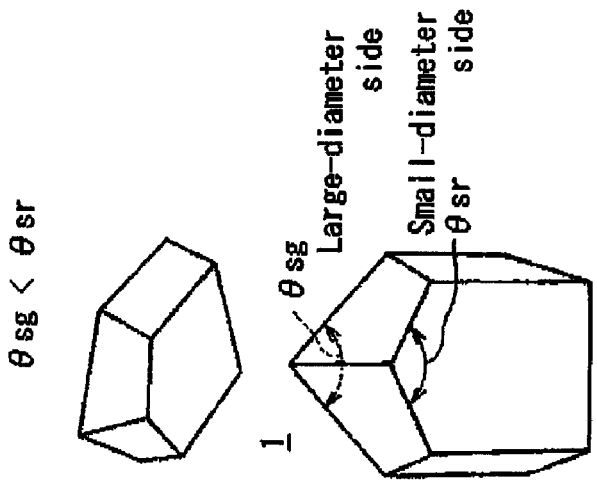
FIG. 2C  Embodiment  $\theta sg < \theta sr$
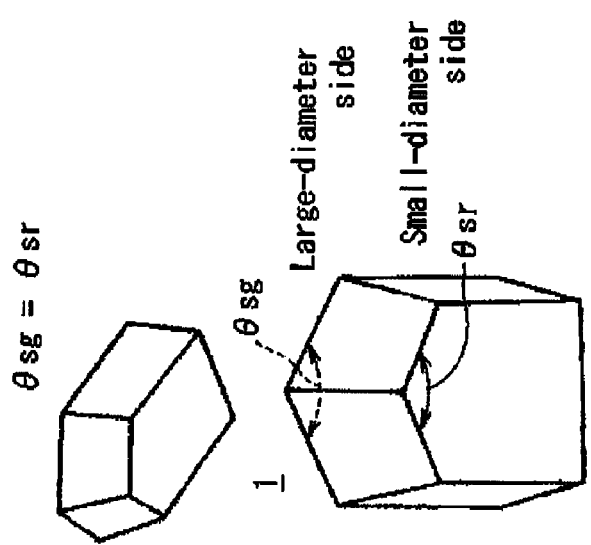
FIG. 2B  Comparative example  $\theta sg = \theta sr$
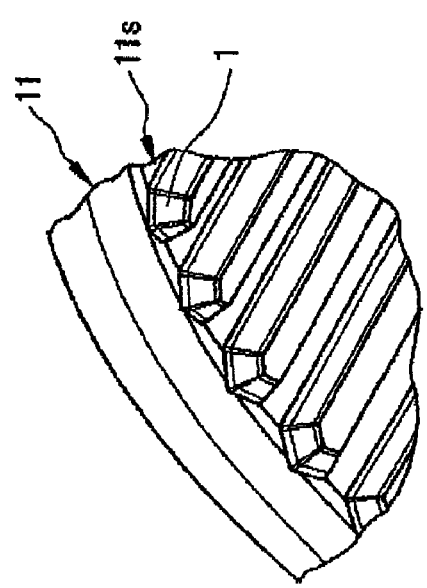
FIG. 2A Comparative example Embodiment Comparative example Embodiment

SYNCHROMESH DEVICE FOR TRANSMISSION

CROSS REFERENCE TO RELATED APPLICATIONS

This application is based on and claims priority under 35 U.S.C. §119 to Japanese Patent Application 2008-131998, filed on May 20, 2008, the entire contents of which is incorporated herein by reference.

FIELD OF THE INVENTION

The present invention relates to a synchromesh device for a transmission.

BACKGROUND

A known synchromesh device for a transmission is disclosed in JP2000-329159A (which will be referred to as reference 1 hereinafter). According to the synchromesh device in reference 1, chamfers are respectively formed at a sleeve, a synchronizer ring and a gear piece. According to reference 1, a shape of the chamfer of the synchronizer ring is modified in order to reduce a gear noise at the time of shifting.

According to the synchromesh device for the transmission, a function where the chamfer of the sleeve contacts the chamfer of the synchronizer ring to achieve a synchronization before a thrust-through operation and a function where the chamfer of the sleeve thrusts through the gear piece to complete shifting may not be actualized at the same time. In other words, when the shape of the chamfer of the sleeve is designed so as to establish an appropriate balk ratio of the synchronizer ring and so as to achieve the synchronization, a shift load required for moving the sleeve so as to thrust through the gear piece is increased and therefore, a shift feeling may be worsened. In contrast, when the shape of the chamfer of the sleeve is designed so as to reduce the shift load required for moving the sleeve so as to thrust through the gear piece, the appropriate balk ratio of the synchronizer ring and the synchronization are not easily achieved, as a result, the gear noise may occur.

A need thus exits for a synchromesh device for a transmission, which is not susceptible to the drawback mentioned above.

SUMMARY OF THE INVENTION

According to an aspect of the present invention, a synchromesh device for a transmission includes: a shaft; a sleeve, spline-engaged to the shaft to be movable relative to the shaft in a shift direction of the sleeve; an idler gear, provided at the shaft, a gear piece, formed at the idler gear; a synchronizer ring, synchronizing a rotation of the idler gear and a rotation of the shaft by sliding on the gear piece to generate a friction force in accordance with shifting of the sleeve; a first spline, a second spline and a third spline formed at an inner circumference of the sleeve, an outer circumference of the gear piece and an outer circumference of the synchronizer ring, respectively, the first spline of the sleeve being engageable with each of the second spline of the gear piece and the third spline of the synchronizer ring; and a first chamfer, a second chamfer and a third chamfer formed at one end of the first spline of the sleeve, one end of the second spline of the gear piece and one end of the third spine of the synchronizer ring, respectively, for a spline-engagement and for a thrust-through operation. The first chamfer of the sleeve includes a small-diameter side thrusting through the third chamfer of the synchronizer ring at the time of shifting and a large-diameter side thrusting through the second chamfer of the gear piece at the time of shifting. A chamfer angle of the large-diameter side is smaller than a chamfer angle of the small-diameter side.

BRIEF DESCRIPTION OF THE DRAWINGS

The foregoing and additional features and characteristics of the present invention will become more apparent from the following detailed description considered with the reference to the accompanying drawings, wherein;

FIG. 1A is an operation diagram illustrating a basic configuration of a synchromesh device according to an embodiment;

FIG. 1B is an operation diagram illustrating the basic configuration of the synchromesh device according to the embodiment;

FIG. 1C is an operation diagram illustrating the basic configuration of the synchromesh device according to the embodiment;

FIG. 2A is a general view illustrating a first spline of a sleeve;

FIG. 2B is a structure diagram illustrating a shape of a chamfer of the sleeve according to a comparative example;

FIG. 2C is a structure diagram illustrating the shape of the chamfer of the sleeve according to the embodiment;

DETAILED DESCRIPTION

Figure 3A:
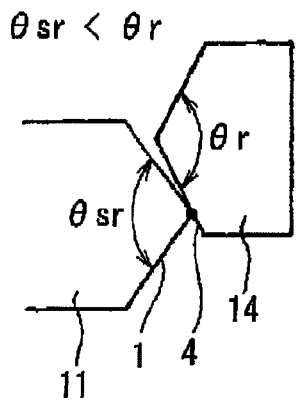
FIG. 3A is an operation diagram illustrating the shape of the chamfer of the sleeve and a shape of a chamfer of a synchronizer ring according to the comparative example.

A detailed description of an embodiment of a synchromesh device will be provided hereinafter with reference to the attached drawings. As illustrated in FIGS. 1A, 2A and 2C, the synchromesh device according to the embodiment includes a shaft, a sleeve 11, an idler gear 12, a gear piece 13 and a synchronizer ring 14. The sleeve 11 is spline-engaged to the shaft to be movable relative to the shaft in a shift direction. The idler gear 12 is provided at the shaft. The gear piece 13 is formed at the idler gear 12. The synchronizer ring 14 synchronizes a rotation of the idler gear 12 with a rotation of the shaft by sliding on the gear piece 13 to generate a friction force in accordance with a shifting of the sleeve 11.

A first spline $11s$, a second spline $13s$ and a third spline $14s$ are formed at an inner circumference of the sleeve 11, an outer circumference of the gear piece 13 and an outer circumference of the synchronizer ring 14, respectively. The first spline $11s$ of the sleeve 11 is engageable with each of the second spline $13s$ of the gear piece 13 and third spline $14s$ of the synchronizer ring 14.

As illustrated in FIG. 1A, a first chamfer 1, a second chamfer 3 and a third chamfer 4 for a spline-engagement and for a thrust-through operation are formed at least one end of the first spline $11s$ of the sleeve, at least one end of the second spline $13s$ of the gear piece 13 and at least one end of the third spline $14s$ of the synchronizer ring 14, respectively. When the sleeve 11 is shifted, a small-diameter side of the first chamfer 1 of the sleeve 11 thrusts through the third chamfer 4 of the synchronizer ring 14 and a large-diameter side of the first chamfer 1 of the sleeve 11 thrusts through the second chamfer 3 of the gear piece 13. "Thrust through" herein describes an operation that the small-diameter side of the first chamfer 1 applies a force on the third chamfer 4 of the synchronizer ring 14 in a rotational direction of the synchronizer ring 14 so that the synchronizer ring 14 is rotated to engage with the first spline 11s at the third spline 14s, and an operation that the large-diameter side of the first chamfer 1 applies a force on the second chamfer 3 of the gear piece 3 in a rotational direction of the gear piece 13 so that the gear piece 13 is rotated to engage with the first spline 11s at the second spline 13s. "Small", as used in the small-diameter side of the first chamfer 1, does not refer to a specific size thereof, but rather because a size of the small-diameter side of the first chamfer 1 is smaller than a size of the large-diameter side of the first chamfer 1. Similarly, "large", as used in the large-diameter side of the first chamfer 1, does not refer to a specific size thereof, but rather because the size of the large-diameter side of the first chamfer 1 is larger than the size of the small-diameter side of the first chamfer 1.

A basic operation of the synchromesh device will be described. The sleeve 1 is rotated integrally with the shaft, the idler gear 12 is idly rotated and the friction force is not generated between the gear piece 13 and the synchronizer ring 14, in a neutral state shown in FIG. 1A. As illustrated in FIG. 1B, when the sleeve 11 is shifted, the sleeve 11 biases the synchronizer ring 14 toward the gear piece 13 and consequently, the friction force is generated between cone surfaces of the gear piece 13 and the synchronizer ring 14 and rotations of the sleeve 11, the synchronizer ring 14 and the gear piece 13 are gradually synchronized. As illustrated in FIG. 3C, after synchronization is completed, the first chamfer 1 of the sleeve 11 thrusts through the third chamfer 4 of the synchronizer ring 14 to be further shifted toward the gear piece 13, the first chamfer 1 of the sleeve 11 thrusts through the second chamfer 3 of the gear piece 13 to be engaged therewith and consequently, a shift operation is completed.

A condition for achieving the above-described synchronization, in other words, the condition for establishing an appropriate balk ratio is: "Tc/Ts≯1". "Tc" is a synchronization torque, which relates to the friction force generated between the synchronizer ring 14 and the gear piece 13, and which is represented by a formula of "Tc∝1/Tan(θr/2)", assuming that "θr" is the chamfer angle of the synchronizer ring 14. "Ts" is a thrust-through torque required for moving the sleeve 11 to thrust through the synchronizer ring 14 so that the synchronizer ring 14 is rotated.

Figure 4A:
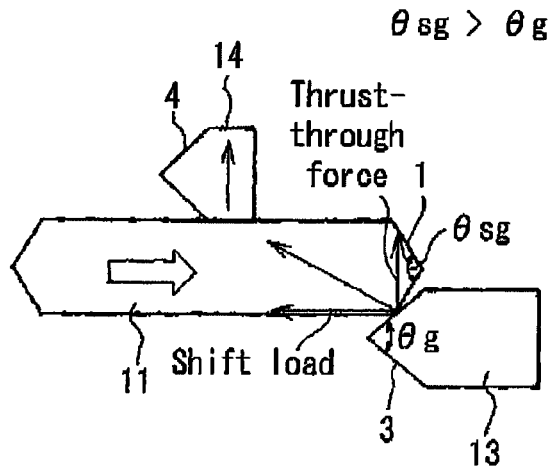
FIG. 4A is an operation diagram illustrating the shape of the chamfer of the sleeve and a shape of a chamfer of a gear piece according to the comparative example.

As illustrated in FIGS. 2A and 2B, a chamfer angle θsg of the large-diameter side and a chamfer angle θsr of the small-diameter side are the same degree in the first chamfer 1 of the sleeve 11, according to a synchromesh device in a comparative example. Further, as illustrated in FIG. 3A, the chamfer angle θsr of the small-diameter side of the first chamfer 1 of the sleeve 11 is smaller than a chamfer angle θr of the third chamfer 4 of the synchronizer ring 14. Furthermore, as illustrated in FIG. 4A, the chamfer angle θsg of the large-diameter side of the first chamfer 1 of the sleeve 11 is larger than a chamfer angle θg of the second chamfer 3 of the gear piece 13.

Figure 3B:
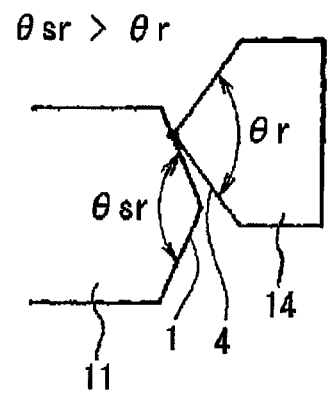
FIG. 3B is an operation diagram illustrating the shape of the chamfer of the sleeve and the shape of the chamfer of the gear piece according to the embodiment.
Figure 4B:
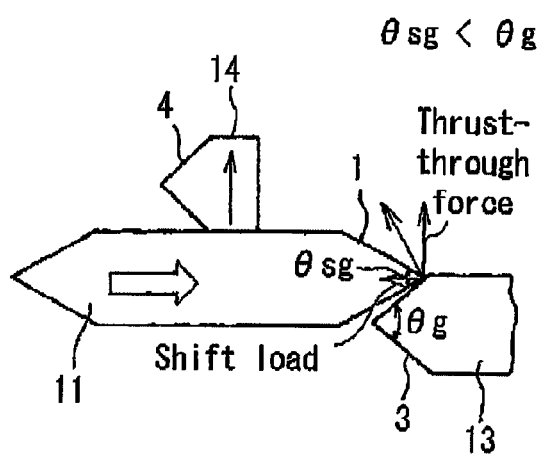
FIG. 4b is an operation diagram illustrating the shape of the chamfer of the sleeve and the shape of the chamfer of the synchronizer ring according to the embodiment.

On the other hand, as illustrated in FIGS. 2A and 2C, the chamfer angle θsg of the large-diameter side is smaller than the chamfer angle θsr of the small-diameter side in the first chamfer 1 of the sleeve 11, according to the synchromesh device in the embodiment. Further, as illustrated in FIG. 3B, the chamfer angle θsr of the small-diameter side of the first chamfer 1 of the sleeve 11 is larger than the chamfer angle θr of the third chamfer 4 of the synchronizer ring 14. Furthermore, as illustrated in FIG. 4B, the chamfer angle θsg of the large-diameter side of the first chamfer 1 of the sleeve 11 is smaller than the chamfer angle θg of the second chamfer 3 of the gear piece 13.

A function of the synchromesh device for a transmission according to the above-described embodiment will be described hereinafter by comparing with a function of the synchromesh device according to the comparative example.

[Sleeve and Synchronizer Ring]

As illustrated in FIG. 3A, the chamfer angle θsr of the small-diameter side of the first chamfer 1 of the sleeve 11 is smaller than the chamfer angle θr of the third chamfer 4 of the synchronizer ring 14 in the synchromesh device according the comparative example. Therefore, when the sleeve 11 is shifted to contact the synchronizer ring 14, the first chamfer 1 of the sleeve 11 may stick into the third chamfer 4 of the synchronizer ring 14, which is made of a relatively soft material. Consequently, the first chamfer 1 of the sleeve 11 does not easily thrust through the third chamfer 4 of the synchronizer ring 14 and further, the sleeve 11 is not easily shifted.

On the other hand, as illustrated in FIG. 3S, the chamfer angle θsr of the small-diameter side of the first chamfer 1 of the sleeve 11 is larger than the chamfer angle θr of the third chamfer 4 of the synchronizer ring 14 in the synchromesh device according to the embodiment. Therefore, when the sleeve 11 is shifted to contact the synchronizer ring 14, the third chamfer 4 of the synchronizer ring 14 contacts a chamfered surface of the first chamfer 1 of the sleeve 11. Consequently, the first chamfer 1 of the sleeve 11 is prevented from sticking into the third chamfer 4 of the synchronizer ring 14 and the first chamfer 1 of the sleeve 11 thrusts through the third chamfer 4 of the synchronizer ring 14. A condition for establishing the appropriate balk ratio is met, and a gear noise, such as a gear grinding sound, which may occur when the first chamfer 1 of the sleeve 11 thrusts through the third chamfer 4 of the synchronizer ring 14 in advance of a completion of the synchronization, is reduced.

[Sleeve and Gear Piece]

As illustrated in FIG. 4A, the chamfer angle θsg of the large-diameter side of the first chamfer 1 of the sleeve 11 is larger than the chamfer angle θg of the second chamfer 3 of the gear piece 13 in the synchromesh device according to the comparative example. Therefore, when the sleeve 11 is further shifted to contact the gear piece 13 after the completion of the synchronization, a relatively small angle is formed between a direction of a shift load and a direction of a component force, applied on a portion where a base angle portion of the first chamfer 1 of the sleeve 11 contacts a chamfered surface of the second chamfer 3 of the gear piece 13. Therefore, a force for rotating the gear piece 13 in a circumferential direction thereof, in other words, a thrust-through force applied on the second chamfer 3 of the gear piece 13 is reduced. Consequently, a shift load required for moving the sleeve 11 so as to thrust through the second chamfer 3 of the gear piece 13 is increased and a shift feeling may be worsened.

On the other hand, as illustrated in FIG. 4B, the chamfer angle θsg of the large-diameter side of the first chamfer 1 of the sleeve 11 is smaller than the chamfer angle θg of the second chamfer 3 of the gear piece 13 in the synchromesh device according to the embodiment. Therefore, when the sleeve 11 is further shifted to contact the gear piece 13 after the completion of the synchronization, a relatively large angle is formed between the direction of the shift load and a direction of a component force, applied on a portion where a tip angle portion of the first chamfer 1 of the sleeve 11 contacts the chamfered surface of the second chamfer 3 of the gear piece 13. Therefore, the force for rotating the gear piece 13 in the circumferential direction thereof, in other words, the thrust-through force applied on the second chamfer 3 of the gear piece 13 is increased. Consequently, the shift load required for moving the sleeve 11 so as to thrust through the second chamfer 3 of the gear piece 13 is reduced, and as a result, the shift feeling may be improved.

The embodiment is applied to a synchromesh device, specifically, to a synchromesh device for a transmission, and more specifically, to a synchromesh device for a manual transmission, which is adapted to a vehicle.

According to the embodiment, the chamfer angle θsr of the small-diameter side is larger than a chamfer angle θr of the third chamfer 4 of the synchronizer ring 14 and the chamfer angle θsg of the large-diameter side is smaller than a chamfer angle θg of the second chamfer 3 of the gear piece 13, in the first chamfer 1 of the sleeve 11.

Accordingly, the chamfer angle θsg of the large-diameter side for thrusting through the second chamfer 3 of the gear piece 13 is smaller than the chamfer angle θsr of the small-diameter side for thrusting through the third chamfer 4 of the synchronizer ring 14, in the first chamfer 1 of the sleeve 11.

When the sleeve 11 is shifted from a neutral position to a predetermined shift position to establish a selected shift stage at the time of shifting of the transmission, the first chamfer 1 of the sleeve 11 contacts the third chamfer 4 of the synchronizer ring 14 to bias the synchronizer ring 14 toward the gear piece 13, a friction force is generated between the synchronizer ring 14 and the gear piece 13 and thereby, the rotations of the sleeve 11, the synchronizer ring 14 and the gear piece 13 are gradually synchronized.

The condition for achieving the above-described synchronization, in other words, the condition for establishing the appropriate balk ratio is: "Tc/Ts≥1". "Tc" is a synchronization torque, which relates to the friction force generated between the synchronizer ring 14 and the gear piece 13, and which is represented by a formula of "Hc∞1/Tan(θr/2)", assuming that "θr" is the chamfer angle of the synchronizer ring 14. "Ts" is a thrust-through torque required for moving the sleeve 11 so as to thrust through the synchronizer ring 14 so that the synchronizer ring 14 is rotated in a circumferential direction thereof.

When the chamfer angle θsr (a tip angle) of the small-diameter side of the first chamfer 1 of the sleeve 11 for thrusting through the third chamfer 4 of the synchronizer ring 14 is smaller than, in other words, more acute than the third chamfer 4 of the synchronizer ring 14, the first chamfer 1 of the sleeve 11, which is made of a relatively hard material, may stick into the third chamfer 4 of the synchronizer ring 14, which is made of relatively soft material. Consequently, the first chamfer 1 of the sleeve 11 does not easily thrust through the third chamfer 4 of the synchronizer ring 14 and further, the sleeve 11 is not easily shifted.

According to the embodiment, a portion of the first chamfer 1 of the sleeve 11 for thrusting through the third chamfer 4 of the synchronizer ring 14, in other words, the chamfer angle θsr of the small-diameter side of the first chamfer 1, is relatively large (obtuse). Therefore, a tip angle portion of the third chamfer 4 of the synchronizer sleeve 14 contacts the chamfered surface of the sleeve 11. Consequently, the first chamfer 1 of the sleeve 11 thrusts through the third chamfer 4 of the synchronizer ring 14. The condition for establishing the appropriate balk ratio for achieving the synchronization is met, and the first chamfer 1 of the sleeve 11 may not thrust through the third chamfer 4 of the synchronizer ring 14 in advance of the completion of the synchronization.

Further, when the chamfer angle θsg (a tip angle) of the large-diameter side of the first chamfer 1 of the sleeve 11 for thrusting through the second chamfer 3 of the gear piece 13 is larger than, in other words, more obtuse than the second chamfer 3 of the gear piece 13, the base angle portion of the first chamfer 1 of the sleeve 11 contacts the chamfered surface of the gear piece 13. Therefore, the shift load, required for moving the first chamfer 1 of the sleeve 11 so as to thrust through the second chamfer 3 of the gear piece 13, is increased, and the shift feeling may be is worsened.

According to the embodiment, a portion of the first chamfer 1 of the sleeve 11 for thrusting through the second chamfer 3 of the gear piece 13, in other words, the chamfer angle θsg of the large-diameter side of the first chamfer 1, is relatively small (acute). Therefore, an end of the first chamfer 1 of the sleeve 11 contacts the chamfered surface of the gear piece 13 after the completion of the synchronization. Consequently, the thrust-through force may be obtained by less shift load, and therefore, the shift feeling may be improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A synchromesh device for a transmission comprising:
a shaft;
a sleeve spline-engaged to the shaft to be movable relative to the shaft in a shift direction of the sleeve;
an idler gear provided at the shaft;
a gear piece formed at the idler gear;
a synchronizer ring synchronizing a rotation of the idler gear and a rotation of the shaft by sliding on the gear piece to generate a friction force in accordance with shifting of the sleeve;
a first spline, a second spline and a third spline formed at an inner circumference of the sleeve, an outer circumference of the gear piece and an outer circumference of the synchronizer ring, respectively, the first spline of the sleeve being engageable with each of the second spline of the gear piece and the third spline of the synchronizer ring; and
a plurality of first chamfers, a second chamfer and a third chamfer formed at one end of the first spline of the sleeve, one end of the second spline of the gear piece and one end of the third spline of the synchronizer ring, respectively, for a spline-engagement and for a thrust-through operation, wherein
each one of the plurality of first chamfers of the sleeve includes a small-diameter side thrusting through the third chamfer of the synchronizer ring at the time of shifting and a large-diameter side thrusting through the second chamfer of the gear piece at the time of shifting, and wherein
a chamfer angle of the large-diameter side is smaller than a chamfer angle of the small-diameter side in the same first chamfer.

2. The synchromesh device according to claim 1, wherein the chamfer angle of the small-diameter side is larger than a chamfer angle of the third chamfer of the synchronizer ring and the chamfer angle of the large-diameter side is smaller than a chamfer angle of the second chamfer of the gear piece.

* * * * *